United States Patent
Ding (10) Patent No.: US 7,624,182 B2
(45) Date of Patent: Nov. 24, 2009

(54) SUPPORTING MULTIPLE SERVICE DISCOVERY PROTOCOLS ON A DEVICE

(75) Inventor: Yi Ding, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 365 days.

(21) Appl. No.: 11/753,468

(22) Filed: May 24, 2007

(65) Prior Publication Data

US 2008/0294776 A1   Nov. 27, 2008

(51) Int. Cl.
*G06F 15/16* (2006.01)
(52) U.S. Cl. ............................ 709/226; 358/1.15
(58) Field of Classification Search ......... 709/200–203, 709/217–227; 358/1.15
See application file for complete search history.

(56) References Cited

U.S. PATENT DOCUMENTS

| | | | |
|---|---|---|---|
| 2005/0052688 A1* | 3/2005 | Maruyama | 358/1.15 |
| 2006/0126114 A1* | 6/2006 | Choi et al. | 358/1.15 |
| 2008/0147872 A1* | 6/2008 | Regnier | 709/230 |
| 2008/0148279 A1* | 6/2008 | Regnier | 719/313 |
| 2009/0021778 A1* | 1/2009 | Wei | 358/1.15 |

OTHER PUBLICATIONS

Beatty et al., "Web Services Dynamic Discovery (WS-Discovery)" downloaded Aug. 22, 2007 from the Internet < http://specs.xmlsoap.org/ws/2005/04/discovery/ws-discovery.pdf > pp. 1-10.
Goland et al., "Simple Service Discovery Protocol/1.0" downloaded Aug. 22, 2007 from the Internet < http://quimby.gnus.org/internet-drafts/draft-cai-ssdp-v1-03.txt > pp. 1-10.

* cited by examiner

*Primary Examiner*—Moustafa M Meky
(74) *Attorney, Agent, or Firm*—Hickman Palermo Truong & Becker LLP; Daniel D. Ledesma (57) ABSTRACT

Techniques for supporting multiple service discovery protocols (SDPs) on a multi-functional peripheral (MFP) are provided. The MFP includes a plurality of SDP services, a plurality of SDP adapters, and a device service management system (DSMS). Each SDP service interfaces with one SDP adapter of the plurality of SDP adapters. Each SDP adapter interfaces with the DSMS. Each SDP adapter translates messages from its corresponding SDP service into a format the DSMS understands, and vice versa. The DSMS manages service metadata information about multiple services provided by the MFP. In response to a request, from a client, for metadata of one or more services provided by the MFP, a SDP service requests the metadata from its corresponding SDP adapter. The SDP adapter requests the metadata from the DSMS, which responds to the SDP adapter with the metadata. The SDP adapter sends the metadata to the SDP service, which sends the metadata to the client.

27 Claims, 4 Drawing Sheets

SUPPORTING MULTIPLE SERVICE DISCOVERY PROTOCOLS ON A DEVICE

FIELD OF THE INVENTION

The present invention relates to Web Services, and more particularly to supporting multiple service discovery protocols on a device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the XML, SOAP, and WSDL standards over a networking protocol, such as IP. XML is used to tag the data, SOAP specifies how to encode a Web service request and response into an XML message, and WSDL is used for describing the services available. Web services are used for programmatic and networked entities to communicate with each other, regardless of the platform for their implementation. Because many such entities are business-related, Web services allow businesses to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for security, reliable messaging, and transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

Some client applications that intend to use Web services provided by a device might implement some standard protocols and not others. Thus, in order for a device to provide Web services to as many client applications as possible, the device should implement as many of the Web Services specifications and other standard protocols as possible. However, updates to existing protocols are certain and new protocols are periodically becoming standards. Such changes usually affect numerous modules of device, meaning that the logic of many modules executing on the device need to be modified. Also, changes to certain modules of a device that are not related to Web services (provided by the device) may require modifying the modules of the device that implement the Web services.

SUMMARY

Techniques for supporting multiple service discovery protocols on multi-functional peripheral (MFP) are provided. In one approach, the MFP includes a plurality of Service Discovery Protocol (SDP) services, a plurality of SDP adapters, and a device service management system (DSMS). Each SDP service interfaces with one SDP adapter of the plurality of SDP adapters. Each SDP adapter interfaces with the DSMS. Each SDP adapter translates messages from its corresponding SDP service into a format the DSMS understands. Each SDP adapter also translates messages from the DSMS into a format the corresponding SDP service understands. The DSMS manages service metadata information about multiple services provided by the MFP.

In response to receiving a request, from a client, for metadata of one or more services provided by the MFP, a SDP service requests the metadata from its corresponding SDP adapter. The SDP adapter requests the metadata from the DSMS, which responds to the SDP adapter with the requested metadata. The SDP adapter sends the requested metadata to the SDP service, which sends the metadata to the client.

In a related approach, the DSMS detects a change in the status of one or more of the services provided by the MFP. The DSMS sends a notification to all SDP adapters (e.g., that have registered with the DSMS). Each SDP adapter translates the notification into a format that its corresponding SDP service understands. Each SDP service then sends a (e.g., multicast or broadcast) advertisement message to one or more clients in the network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example Service Discovery Protocol Architecture

Figure 1:
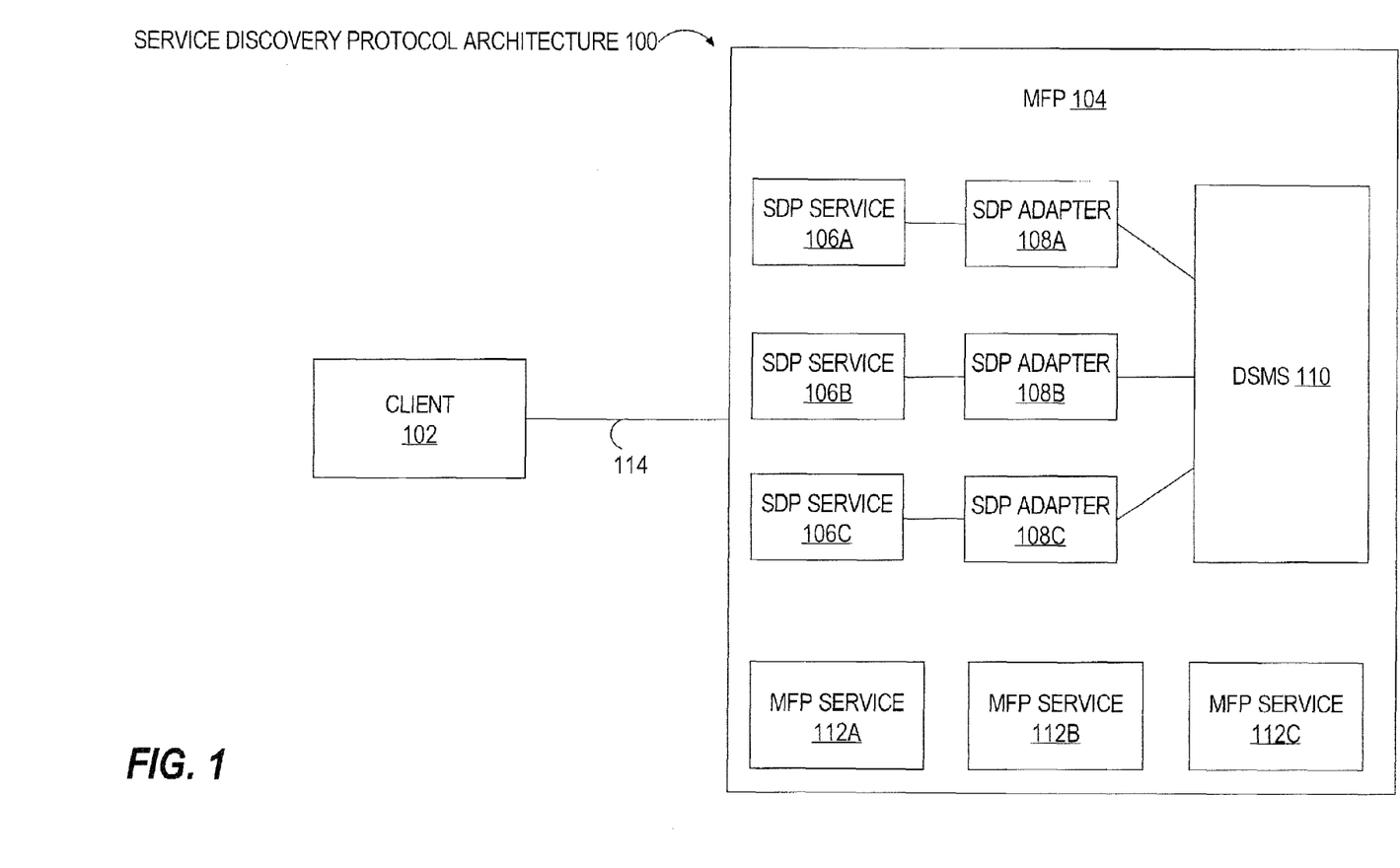
FIG. 1 is a block diagram that illustrates an example service discovery protocol (SDP) architecture for interaction between a client and a MFP, according to an embodiment of the invention.

FIG. 1 is a block diagram that illustrates an example service discovery protocol (SDP) architecture 100 for interaction between a client 102 and a multi-functional peripheral (MFP) 104, according to an embodiment of the invention.

Client 102 sends a discovery request to MFP 104. The discovery request conforms to a standard discovery protocol, such as WS-Discovery. In one embodiment, a discovery request may request the type services that are provided by a MFP without the accompanying service metadata for each service. If a user of client 102 intends to use one of the services of the MFP, then the client 102 may send a service discovery request that requests the service metadata of just the selected service. Alternatively, the discovery request initially requests the service metadata of all services provided by a MFP.

Client 102 is communicatively coupled to MFP 104 via communication link 114. Communications link 114 may be implemented by any medium or mechanism that provides for the exchange of data between client 102 and MFP 104. Examples of communications link 114 include, without limitation, a network such as a Local Area Network (LAN), Wide Area Network (WAN), Ethernet or the Internet, or one or more terrestrial, satellite, or wireless links.

Multi-Functional Peripheral

An MFP is a device that comprises two or more service applications that each provides at least one service. The difference services that an MFP provides may include, without limitation, a print service, a scan service, a fax service, and an archive service. If one of the services provided by an MFP is a print service, then the print service application includes a print process for processing print data and causing a printed version of an electronic document reflected in the print data to be generated. In FIG. 1, the two or more service applications are MFP services 112A-112C.

MFP 104 also comprises a device service management system (DSMS) 110. DSMS 110 manages MFP services 112A-12C (collectively referred to hereinafter as "MFP services 112"). DSMS 110 may be implemented in hardware circuitry, in computer software, or a combination of hardware circuitry and computer software, and is not limited to a particular hardware or software implementation.

DSMS 110 obtains service state information and service metadata information for each MFP service 112. DSMS 110 provides a common interface for multiple SDP service modules 106A-C (collectively referred to in the Figures and hereinafter as "SDP services 106") that MFP 104 supports.

Although FIG. 1 illustrates three SDP services 106, MFP 104 may only support two SDP services 106 or may support more than three SDP services 106.

Service Discovery Protocol Services

SDP services 106 provide implementations of SDP protocols. Each SDP service 106 may be implemented in hardware circuitry, in computer software, or a combination of hardware circuitry and computer software, and is not limited to a particular hardware or software implementation. Non-limiting examples of SDP services 106 include WS-Discovery and Simple Service Discovery Protocol (SSDP), both of which are (or at least were) standards. Many more SDP services may be developed in the future. If client 102 is limited to a set of one or more SDPs, each of which is not supported by MFP 104, then client 102 will not be able to discover (and thus utilize) MFP services 112 provided by MFP 104, such as printing, scanning, or faxing.

Most SDP services have the following basic features. First, in response to becoming notified that a device service (e.g., MFP service 112C) becomes available or becomes unavailable, a SDP service sends an advertisement to notify "the world" (i.e., all clients in the network), or at least those clients that have registered to be notified of such events. Second, a SDP service receives discovery requests from clients, requests service metadata, and forwards the service metadata to clients.

Service Discovery Protocol Adapters

SDP adapter modules 108A-C (collectively referred to in the Figures and hereinafter as "SDP adapters 108") are the bridges between SDP services 106 and DSMS 110. For example, SDP adapter 108A is the bridge between SDP service 106A and DSMS 110, SDP adapter 108B is the bridge between SDP service 106B and DSMS 110, and so on. Like SDP services 106, SDP adapters 108 may be implemented in hardware circuitry, in computer software, or a combination of hardware circuitry and computer software, and is not limited to a particular hardware or software implementation.

A SDP adapter 108 translates data from its corresponding SDP service 106 (that is in a native format) into data that is consistent with a format that DSMS 110 can understand. Similarly, a SDP adapter 108 translates data from DSMS 110 (that is in a native format) into data that is consistent with a format that a corresponding SDP service can understand. As a result, SDP adapters 108 essentially "decouple" SDP services 106 from DSMS 110. This decoupling allows DSMS 110 to handle multiple SDP services 106 without being required to know anything about any service among SDP services 106. This decoupling also allows SDP services 106 to be moved to a different device with a different DSMS. The only modifications required in this case would be modifications to the corresponding SDP adapters in order for the SDP adapters to communicate with the different DSMS.

Thus, an adapter of SDP adapters 108 is an adapter for a specific service among SDP services 106. Therefore, for example, SDP adapter 108B "knows" (i.e., includes logic for interacting with) the interface of SDP service 106B and what SDP service 106B expects. Also, an SDP adapter "knows" the interface to DSMS 110 in order to be able to properly request and receive data from DSMS 110.

Therefore, each SDP adapter 108 supports at least two interfaces—one interface to its corresponding SDP service 106 and one interface to DSMS 110. The interface to a SDP service 106 is protocol specific. The interface to DSMS 110 is defined by DSMS 110's common interface for SDP services 106. Thus, all SDP adapters 108 support the common interface.

Device Service Management System

To support the above features, DSMS 110 provides at least the following interface for SDP adapters 108—registration, notification, and device service metadata.

With respect to registration, most SDP protocols support advertisements to indicate that a device service is up or down. To support this advertisement feature, DSMS 110 provides a registration API that a SDP adapter 108 uses to register with DSMS 110. In an embodiment, in response to registering with DSMS 110, a SDP adapter 108 receives a unique identification of the corresponding SDP service 106. Because there are multiple SDP services 106, DSMS 110 uses the unique ID to know which SDP service 106, e.g., sent a request for service metadata. The DSMS 110 uses the unique ID to send a response (e.g., service metadata) to the appropriate SDP adapter 108.

With respect to notification, in response to detecting that a service (e.g., MFP service 112C) becomes available or becomes unavailable, DSMS 110 sends each SDP adapter 108 (e.g., that has registered with DSMS 110) a notification, e.g., via a notification API.

With respect to providing service metadata, SDP adapters 108 are able to send a request to DSMS 110 for metadata information about one or more MFP services 112, e.g., via a query metadata API. Non-limiting examples of service specific metadata include a URL, a type of service, and a service endpoint. The URL is used by the client that is requesting the service metadata to communicate directly with the appropriate MFP service 112. Depending on the particular MFP service 112, the type of service may be printer, scanner, camera, etc. The service endpoint specifies how to contact an MFP service 112, such as specifying an IP address and port number associated with the MFP service 112.

Sequence Diagram

Figure 2:
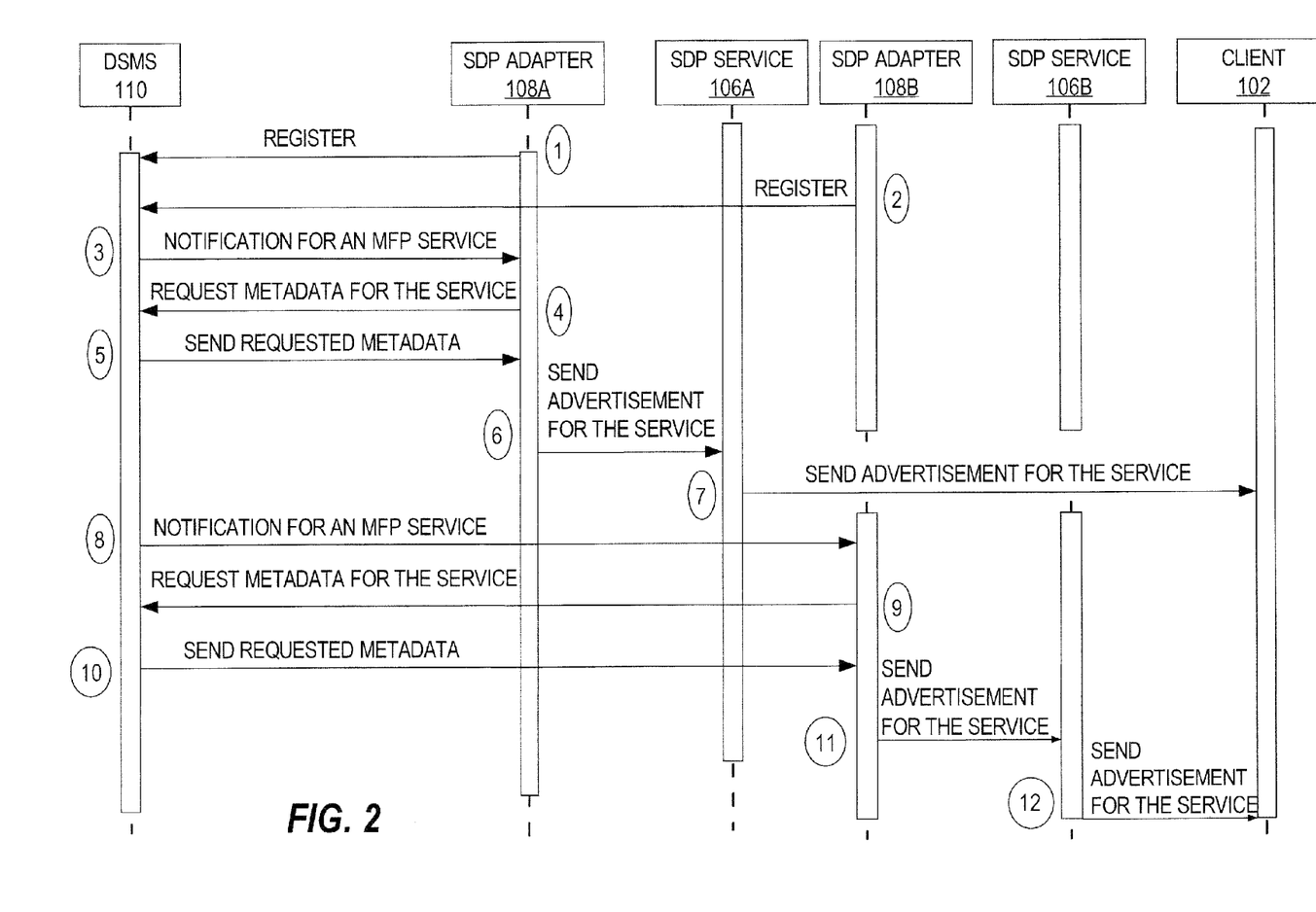
FIG. 2 is a sequence diagram that illustrates how SDP adapters and SDP services register to a device service management system (DSMS), how notifications of a device service are received, and how SDP services send out advertisements, according to an embodiment of the invention.

FIG. 2 is a sequence diagram that illustrates how SDP adapters and SDP services register to a DSMS, how notifications of a device service are received, and how SDP services send out advertisements, according to an embodiment of the invention.

At step 1, in order to receive notifications and service metadata from DSMS 110, SDP adapter 108A registers with DSMS 110 by sending a register message to DSMS 110. Similarly, at step 2, SDP adapter 108B registers with DSMS 110 by sending a register message to DSMS 110.

At step 3, sometime after SDP adapter 108A registers with DSMS 110, DSMS sends a notification to SD adapter 108A that indicates, e.g., a new MFP service 112 available on MFP 104 to one or more clients.

At step 4, SDP adapter 108A requests the service metadata for the new MFP service 112. In response, at step 5, DSMS 110 sends the requested service metadata to SDP adapter 108A. Alternatively, the notification sent from DSMS 110 in step 3 may include the service metadata of the new MFP service 112. In this way, SDP adapter 108A is not required to separately request the service metadata.

At step 6, in response to the notification and service metadata from DSMS 110, SDP adapter 108A sends a notification to SDP service 106A in a format that SDP service 106A "understands."

At step 7, SDP service 106A sends an advertisement of the new MFP service 112 to one or more clients, such as client 102. Multiple clients may have registered with SDP service 106A about being notified when new MFP services 112 are added and/or when existing MFP services 112 become unavailable. In that case, at least those clients that have registered for a particular event will be notified when the particular event occurs. Alternatively, SDP service 106A may send a broadcast or multicast advertisement message to clients in the network to notify those clients that a new MFP service 112 is available on MFP 104.

Steps 8-12 are similar to steps 3-7 except that the SDP adapter is SDP adapter 108B and the SDP service is SDP service 106B. Although steps 8-12 are depicted as occurring after steps 3-7, steps 8-12 may have occurred before steps 3-7 or interleaved with steps 3-7. For example, the order of occurrence may be steps 1, 2, 8, 3, 4, 9, 10, 5, 11, 12, 6, and 7.

As FIG. 2 illustrates, client 102 receives two advertisements. Typically, only one such advertisement is sent to one or more clients because current MFPs usually implement only one SDP protocol. However, according to embodiments of the invention, because MFP 104 does not know which SDP(s) a client supports, all SDP services on an MFP will send out advertisements to ensure that all clients in the network are notified. If a client does not understand an advertisement, then the client may discard the advertisement.

Flow Diagram

Figure 3:
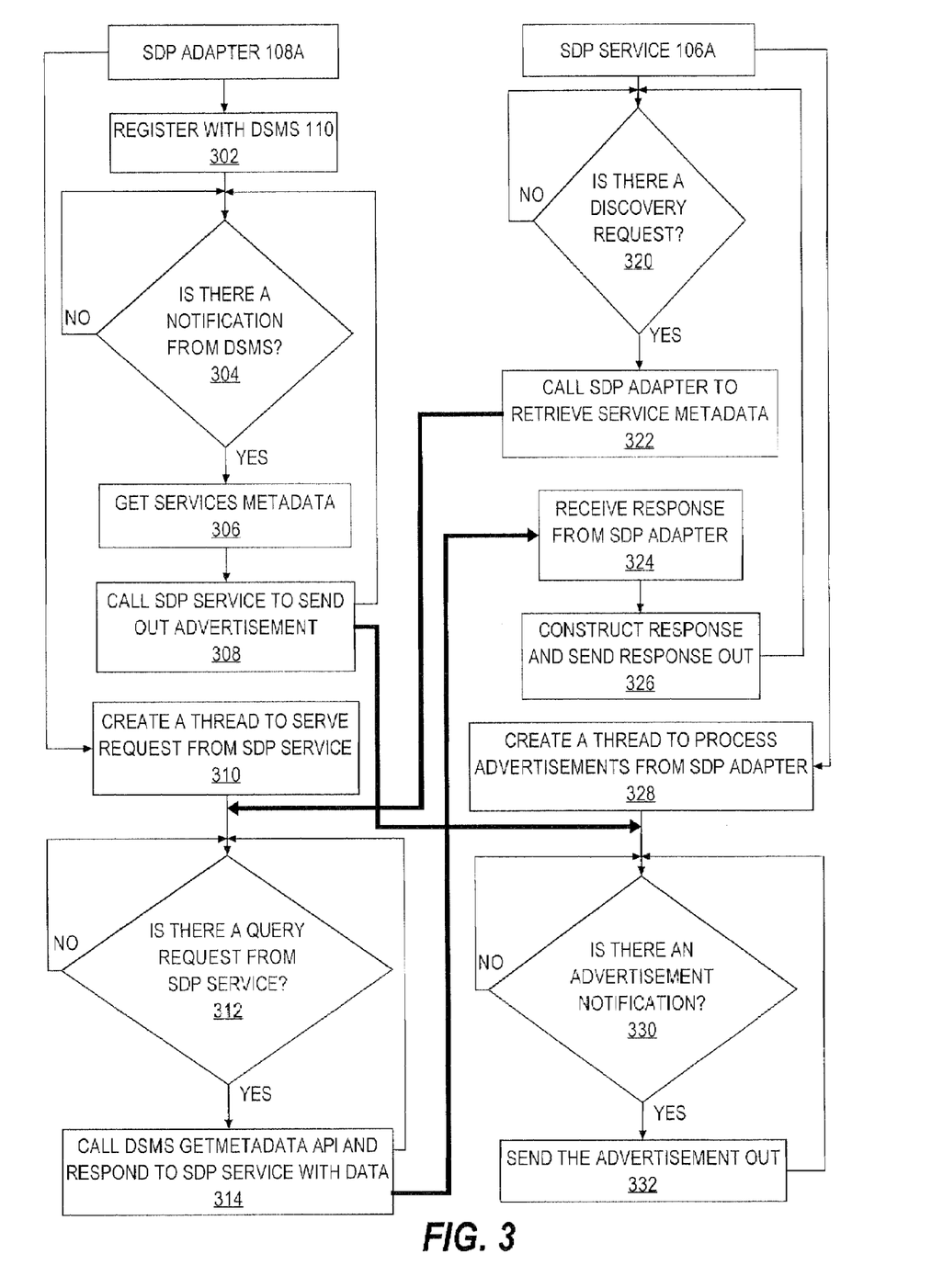
FIG. 3 is a flow diagram that illustrates another view of how a SDP adapter and a SDP service interact, according to an embodiment of the invention.

FIG. 3 is a flow diagram that illustrates another view of how a SDP adapter and a SDP service interact, according to an embodiment of the invention.

At step 302, SDP adapter 108A registers with DSMS 110. At step 304, SDP adapter 108A continuously (or periodically) checks to determine whether a notification from DSMS 110 has been received. If so, then the process proceeds to step 306 where SDP adapter 108A receives service metadata from DSMS 110.

At step 308, SDP adapter 108A calls SDP service 106A to send out an advertisement. After step 308, the process for SDP adapter 108A returns to step 304.

As illustrated in FIG. 3, the bolded lines indicate that a message is sent from SDP adapter 108A to SDP service 106A or vice versa. Thus, step 308 also indicates that a message is sent from SDP adapter 108A to SDP service 106A. As FIG. 3, indicates SDP service 106A processes the advertisement (of step 308) at step 330.

At step 328, SDP service 106A creates a thread to process advertisements from SDP adapter 108A. At step 330, the thread "listens" (e.g., on a particular port) to determine whether an advertisement has been received from (or is intended to be sent from) SDP adapter 108A. If so, then the process proceeds to step 332. At step 332, the threads sends an advertisement to one or more clients, such as client 102, indicating, e.g., that a MFP service 112 has become unavailable.

At step 320, SDP service 106A determines whether a discovery request has been received. If a discovery request (e.g., from client 102) has been received, then the process proceeds to step 322.

At step 322, SDP service 106A processes the discovery request by calling SDP adapter 108A to retrieve the request service metadata for one or more of MFP services 112.

At step 310, SDP adapter 108A creates a thread to serve requests from SDP service 106A. At step 312, the thread "listens" (e.g., on a particular port) to determine whether SDP service 106A sent a service metadata request. If so, then the process proceeds to step 314.

At step 314, SDP adapter 108A retrieves service metadata from DSMS 110 (e.g., via a getmetadata API call) and responds to SDP service 106A with the requested service metadata.

At step 324, SDP service 106A receives the requested service metadata from SDP adapter 108A. At step 326, SDP service 106A constructs a response message based on the requested service metadata and sends the response message to, e.g., the client that initially sent the discovery request that was processed at step 320. After a client receives service metadata of one or more MFP services 112, client may communicate directly with one or more MFP services 112.

In summary, a SDP adapter 108 may create two threads—one thread for processing notifications from DSMS 110 and another thread for processing discovery requests from a corresponding SDP service 106. Similarly, a SDP service 106 may create two threads—one thread for processing notifications from a corresponding SDP adapter 108 and another thread for processing discovery requests from a client.

Benefits

One benefit of some embodiments of the invention is that if DSMS 110 is modified, then only SDP adapters 108 need to be modified rather than any of SDP services 106.

Another benefit of some embodiments of the invention is that if a new MFP service is added or removed from MFP 104, then neither SDP services 106, SDP adapters 108, nor DSMS 110 needs to be modified.

Another benefit of some embodiments of the invention is that if a SDP service 106 is modified, then only its corresponding SDP adapter 108 needs to be modified rather than DSMS 110. Similarly, a new SDP service may be added to MFP 104 without modifying DSMS 110.

Another benefit of some embodiments of the invention is that if SDP services 106 are required by another device (e.g., another MFP) where the DSMS of the other device is not the same, then SDP services 106 do not need to be rewritten. Instead, the only modification that would be required is modifying each corresponding SDP adapter so that each corresponding SDP can interface with the new DSMS.

Implementation Mechanisms

Figure 4:
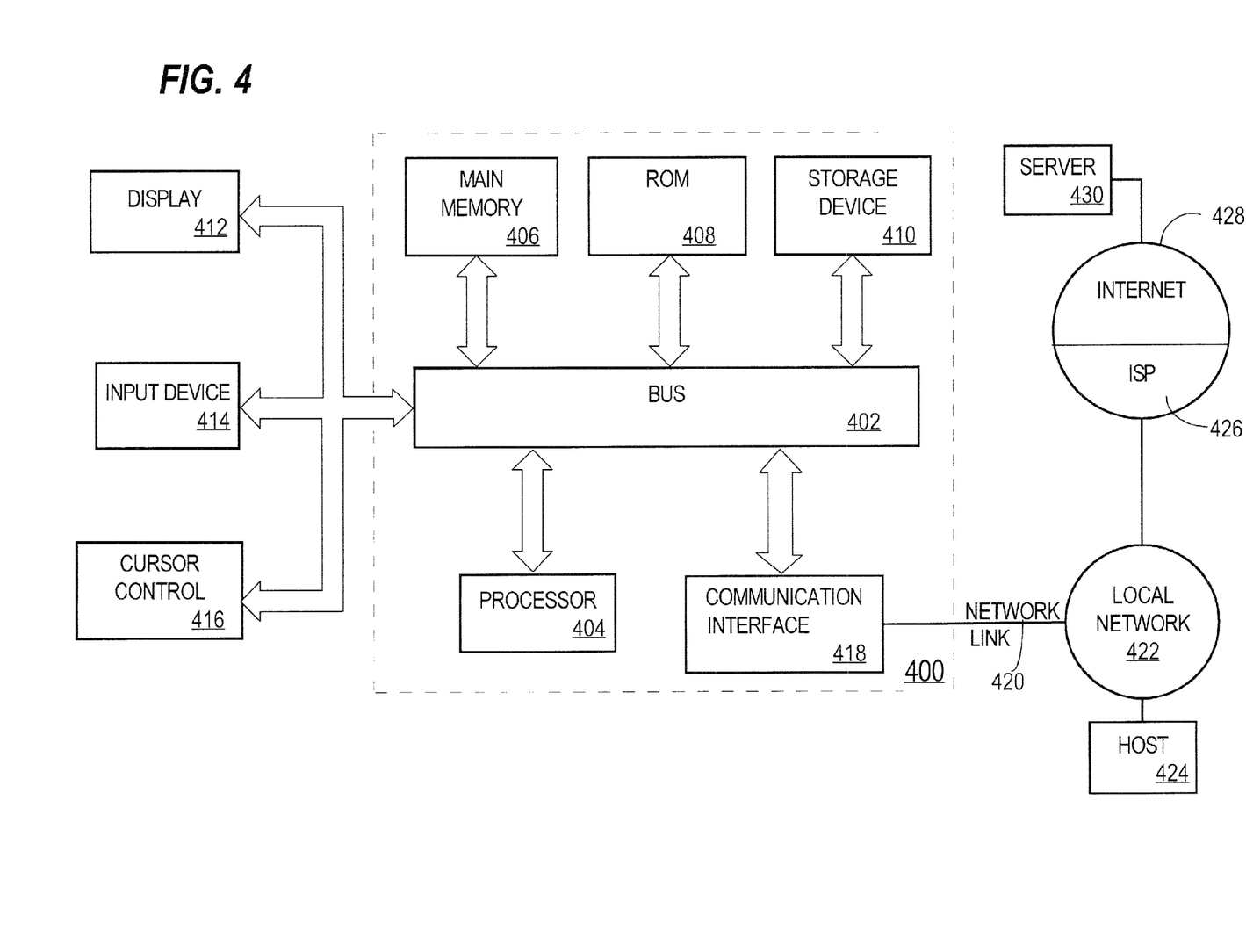
FIG. 4 is a block diagram that illustrates a computer system upon which an embodiment of the invention may be implemented.

The approaches described herein may be implemented on any type of computing platform or architecture. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network-enabled printing device for supporting a plurality of service discovery protocols (SDPs), wherein the network-enabled printing device comprises a plurality of service applications that each provides at least one service, the network-enabled printing device comprising:
    a plurality of SDP service modules, wherein each SDP service module of the plurality of SDP service modules implements a different SDP of the plurality of SDPs;
    a plurality of SDP adapter modules;
    a device service management system (DSMS) that obtains metadata for each service of the plurality of services;
    wherein each SDP service module of the plurality of SDP service modules interfaces with a different SDP adapter module of the plurality of SDP adapter modules;
    wherein each SDP adapter module of the plurality of SDP adapter modules interfaces with the DSMS;
    wherein one of the plurality of service applications includes a print process for processing print data and causing a printed version of an electronic document reflected in the print data to be generated;
    based on a request from a client, a particular SDP service module of the plurality of SDP service modules sends a second request to the corresponding SDP adapter module;
    based on the second request, the corresponding SDP adapter module sends a third request to the DSMS;
    the DSMS sends the metadata to the corresponding SDP adapter module;
    the corresponding SDP adapter module sends the metadata to the particular SDP service module; and
    based on the metadata, the particular SDP service module generates and sends a response to the client.

2. The network-enabled printing device of claim 1, wherein a different SDP is one of Web Services Discovery or Simple Service Discovery Protocol.

3. The network-enabled printing device of claim 1, wherein a service provided by a service application of the plurality of service applications includes one of a print service, a fax service, an archive service, and a scan service.

4. The network-enabled printing device of claim 1, wherein:
    the DSMS sends a notification to each SDP adapter module of the plurality of SDP adapter modules, wherein the notification includes first data that indicates the status of one or more of the services;
    based on the notification, said each SDP adapter module sends a first message to a corresponding SDP service module; and
    based on the first message, the corresponding SDP service module generates and sends, to one or more clients, a second message that includes second data about the notification.

5. The network-enabled printing device of claim 4, wherein the notification is one of an indication that the one or more services are recently added to the MFP or an indication that the one or more services are unavailable at the MFP.

6. The network-enabled printing device of claim 1, wherein a service application is added to the network-enabled printing device without modifying the DSMS, any SDP service module of the plurality of SDP service modules, or any SDP adapter module of the plurality of SDP adapter modules.

7. The network-enabled printing device of claim 1, wherein a SDP service module and a corresponding SDP adapter module is added to the network-enabled printing device without modifying the DSMS.

8. The network-enabled printing device of claim 1, further comprising modifying a particular SDP service module of the plurality of SDP service modules without modifying the DSMS.

9. The network-enabled printing device of claim 1, further comprising modifying the DSMS without modifying any of the plurality of SDP service modules.

10. A method for receiving a request for metadata of one or more services provided by a multi-functional peripheral (MFP), wherein the MFP comprises a plurality of service applications that each provides at least one service, wherein the MFP supports a plurality of service discovery protocols (SDPs), the method comprising:
    receiving the request from a client, wherein:
        each SDP service module of a plurality of SDP service modules implements a different SDP of the plurality of SDPs;
        each SDP service module of the plurality of SDP service modules interfaces with a different SDP adapter module of a plurality of SDP adapter modules;
        each SDP adapter module of the plurality of SDP adapter modules interfaces with a device service management system (DSMS) that obtains metadata for each service of the plurality of services;
        one of the plurality of service applications includes a print process for processing print data and causing a printed version of an electronic document reflected in the print data to be generated;
    based on the request, a particular SDP service module of the plurality of SDP service modules sending a second request to the corresponding SDP adapter module;
    based on the second request, the corresponding SDP adapter module sending a third request to the DSMS;

the DSMS sending the metadata to the corresponding SDP adapter module;

the corresponding SDP adapter module sending the metadata to the particular SDP service module; and based on the metadata, generating and sending a response to the client.

11. The method of claim 10, wherein a different SDP is one of Web Services Discovery or Simple Service Discovery Protocol.

12. The method of claim 10, wherein a service provided by a service application of the plurality of service applications includes one of a print service, a fax service, an archive service, and a scan service.

13. The method of claim 10, further comprising:

the DSMS sending a notification to each SDP adapter module of the plurality of SDP adapter module, wherein the notification includes first data that indicates the status of one or more of the services;

based on the notification, said each SDP adapter module sending a first message to a corresponding SDP service module; and based on the first message, the corresponding SDP service module generating and sending, to one or more clients, a second message that includes second data about the notification.

14. The method of claim 13, wherein the notification is one of an indication that the one or more services are recently added to the MFP or an indication that the one or more services are unavailable at the MFP.

15. The method of claim 10, further comprising adding a service application to the MFP without modifying the DSMS, any SDP service module of the plurality of SDP service modules, or any SDP adapter module of the plurality of SDP adapter modules.

16. The method of claim 10, further comprising adding a SDP service module and a corresponding SDP adapter module to the MFP without modifying the DSMS.

17. The method of claim 10, further comprising modifying a particular SDP service module of the plurality of SDP service modules without modifying the DSMS.

18. The method of claim 10, further comprising modifying the DSMS without modifying any of the plurality of SDP service modules.

19. A machine-readable medium for receiving a request for metadata of one or more services provided by a multi-functional peripheral (MFP), wherein the MFP comprises a plurality of service applications that each provides at least one service, wherein the MFP supports a plurality of service discovery protocols (SDPs), the machine-readable medium carrying instructions which, when processed by one or more processors, causes:

receiving the request from a client, wherein:

each SDP service module of a plurality of SDP service modules implements a different SDP of the plurality of SDPs;

each SDP service module of the plurality of SDP service modules interfaces with a different SDP adapter module of a plurality of SDP adapter modules;

each SDP adapter module of the plurality of SDP adapter modules interfaces with a device service management system (DSMS) that obtains metadata for each service of the plurality of services;

one of the plurality of service applications includes a print process for processing print data and causing a printed version of an electronic document reflected in the print data to be generated;

based on the request, a particular SDP service module of the plurality of SDP service modules sending a second request to the corresponding SDP adapter module;

based on the second request, the corresponding SDP adapter module sending a third request to the DSMS;

the DSMS sending the metadata to the corresponding SDP adapter module;

the corresponding SDP adapter module sending the metadata to the particular SDP service module; and based on the metadata, generating and sending a response to the client.

20. The machine-readable medium of claim 19, wherein a different SDP is one of Web Services Discovery or Simple Service Discovery Protocol.

21. The machine-readable medium of claim 19, wherein a service provided by a service application of the plurality of service applications includes one of a print service, a fax service, an archive service, and a scan service.

22. The machine-readable medium of claim 19, wherein the instructions, when processed by the one or more processors, further causes:

the DSMS sending a notification to each SDP adapter module of the plurality of SDP adapter module, wherein the notification includes first data that indicates the status of one or more of the services;

based on the notification, said each SDP adapter module sending a first message to a corresponding SDP service module; and based on the first message, the corresponding SDP service module generating and sending, to one or more clients, a second message that includes second data about the notification.

23. The machine-readable medium of claim 22, wherein the notification is one of an indication that the one or more services are recently added to the MFP or an indication that the one or more services are unavailable at the MFP.

24. The machine-readable medium of claim 19, wherein the instructions, when processed by the one or more processors, further causes adding a service application to the MFP without modifying the DSMS, any SDP service module of the plurality of SDP service modules, or any SDP adapter module of the plurality of SDP adapter modules.

25. The machine-readable medium of claim 19, wherein the instructions, when processed by the one or more processors, further causes adding a SDP service module and a corresponding SDP adapter module to the MFP without modifying the DSMS.

26. The machine-readable medium of claim 19, wherein the instructions, when processed by the one or more processors, further causes modifying a particular SDP service module of the plurality of SDP service modules without modifying the DSMS.

27. The machine-readable medium of claim 19, wherein the instructions, when processed by the one or more processors, further causes modifying the DSMS without modifying any of the plurality of SDP service modules.

* * * * *